United States Patent [19]
Leider

[11] Patent Number: 5,155,934
[45] Date of Patent: Oct. 20, 1992

[54] CONTAINER INSERT

[75] Inventor: Gerald F. Leider, Lincolnshire, Ill.

[73] Assignee: Tropical Plant Rentals, Inc., Riverwoods, Ill.

[21] Appl. No.: 570,104

[22] Filed: Aug. 17, 1990

[51] Int. Cl.$^5$ ............................................. A01G 9/02
[52] U.S. Cl. ........................................ 47/86; 47/79; 47/87
[58] Field of Search .................. 47/73, 79, 80, 86, 87, 47/62, 63, 64

[56] References Cited

U.S. PATENT DOCUMENTS

| | | | |
|---|---|---|---|
| 3,142,133 | 7/1964 | Brooks | 47/73 |
| 4,270,309 | 6/1981 | Baumann | 47/79 X |
| 4,803,806 | 2/1989 | Ito | 47/87 X |

FOREIGN PATENT DOCUMENTS

| | | | |
|---|---|---|---|
| 245312 | 2/1966 | Austria | 47/63 |
| 2717851 | 11/1978 | Fed. Rep. of Germany | 47/79 |
| 1131156 | 10/1968 | United Kingdom | 47/79 |

Primary Examiner—David A. Scherbel
Assistant Examiner—Joanne C. Downs
Attorney, Agent, or Firm—Quarles & Brady

[57] ABSTRACT

An insert for a planting container is useful to support planting soil above a water reservoir. A base member includes several leg openings, a fill tube opening, and a plurality of air vents. Hollow leg members are attached to the base member to maintain the base member above the floor of the container. The leg members have conduits that are open to the leg openings. Flaps are flexibly connected to the periphery of the base member. The flaps contact the inside walls of the container and prevent soil from falling beneath the insert. A fill tube is positioned in the fill tube opening and is designed to extend from the floor of the container to a position above the soil. Water added to the fill tube creates a water reservoir beneath the base member. A webbed cover portion attached to the bottom of the leg members has slots that allow water to enter the conduits of the leg members. Soil may fill the conduits and draw water from the reservoir, while soil on the base member is aerated through the air vents.

21 Claims, 2 Drawing Sheets

CONTAINER INSERT

BACKGROUND OF THE INVENTION

This invention relates to an insert for a container. More particularly, it pertains to an insert for a planting container that partially suspends soil above a water reservoir and allows the soil to be aerated from below.

Plants are frequently grown in containers, such as pots and flower boxes. The containers are generally filled with soil with the plant being generally located near the top of the soil. The plant is watered by adding water to the top of the soil and allowing it to gravitate downward through the soil. This traditional planting and watering system has a number of drawbacks. For instance, top watering a soil-filled container results in the soil frequently becoming saturated near the bottom of the container. Such saturation prohibits the roots of the plant from obtaining the air necessary for the plant's existence. Also, top watering tends to compact the soil which reduces the amount of air within the soil and causes the soil to become saturated more quickly. Likewise, watering the plant from above results in lost water due to run off and evaporation.

In an attempt to deal with some of these drawbacks, plant containers have been formed with access holes near the bottom of the container. Such holes allow excess water to drain from the container and also provide an opening through which air may contact the soil near the bottom of the container. These types of containers do not address all of the problems associated with top watering, and have several disadvantageous features of their own. Primarily, the plant container must utilize a second container or include a water retaining area to retain the water which drains through the holes. If the holes themselves are too large, soil will wash out through the holes along with the water. Conversely, if the holes are too small, the water flow through the holes will plug the holes and cut off the supply of air to the soil.

Thus, a need exists for an insert for a planting container which allows interaction between air and the bottom of the soil, substantially eliminates the aforementioned drawbacks associated with watering soil from above, and minimizes the area of soil that is subject to saturation.

SUMMARY OF THE INVENTION

This invention provides an insert for use with a plant container. In general, the insert has a base member that is sized to fit within the container and that includes a leg opening. The insert also has a leg member with a top portion and an opposite bottom portion. A conduit extends between the top and bottom portions. The leg member is attached to the base member so that the conduit is open to the leg opening. A plurality of flaps are flexibly connected to the base member. The flaps are positioned adjacent one another about the periphery of the base member. This aspect of the invention results in a container insert that supports the soil above a water reservoir. Soil within the conduit is exposed to the water and will draw water upward to the plant and the remainder of the soil.

In another aspect of the invention, the flaps have an attachment edge, an opposite outer edge, and two sides extending between the attachment and outer edges. The attachment edge is flexibly connected to the periphery of the base member so that each flap may be positioned in a plane transverse to the plane containing the base member. This aspect of the invention allows a container insert of a particular size to be used with a range of container sizes. The angle of the flaps relative to the base member conforms to the interior diameter of the container. The flaps contact the interior walls of the container and maintain the soil above the insert.

In another aspect, the sides of neighboring flaps are oppositely tapered. When the insert in placed into a container, the tapered sides allow neighboring flaps to glide over one another rather than cause them to buckle. The flaps overlap somewhat to minimize the amount of soil which may fall beneath the insert.

In another aspect, the base member is formed with a plurality of air vents. Water is added to the container to a level beneath the height of the base member, thereby creating an air gap between the water and the base member. The air vents allow air to pass between the air gap and the soil above the insert.

In another aspect, the base member has a fill tube opening and the insert includes a fill tube that is positioned in the fill tube opening. The fill tube preferably extends from the top of the soil to the floor of the container. Water added to the fill tube forms a reservoir beneath the insert, adjacent the bottom portion of the leg member. This aspect of the invention lessens the degree of soil compacting and minimizes water run off and evaporation. The area beneath the insert provides a large reservoir for water, thereby allowing a longer time interval between waterings. The soil receives a more even distribution of water, and there is a minimal amount of saturated soil. Also, the water is not directed through the air vents so the veins do not readily become plugged and soil is not washed through the vents.

In another aspect, a webbed cover portion is attached to the bottom portion of the leg member. The cover portion includes a slot and a plurality of nubs. This aspect allows water to enter the conduit of the leg member without permitting a substantial amount of soil from entering the water reservoir. The nubs elevate the leg member from the floor of the container to provide a continuous path for water to pass between the reservoir and the conduit.

In another aspect, the leg members are conically shaped so that the top portion has a larger diameter than the bottom portion. This aspect lessens the amount of soil near the bottom portion of the leg members, which minimizes the amount of soil that is subject to saturation.

In another aspect of the invention, the base member, the leg members and the flaps are integrally formed. These components may be formed of a plastic material by an injection molding process. This aspect results in an insert for a container that is easy to manufacture and simple to use.

In another aspect of the invention, the base member has four leg openings and there are four leg members that correspond with the leg openings. This preferred design provides a sturdy insert structure to support the weight of the soil and plant the water reservoir. The structure also allows sufficient water intake by the soil.

Therefore, it is an object of the present invention to provide an insert for a planting container that establishes a water reservoir generally beneath the soil and allows a portion of the soil to contact the water to thereby draw sufficient water throughout the soil.

It is another object of the invention to provide a container insert that is capable of creating an air gap between the water reservoir and the insert to constantly expose the soil near the bottom of the container to air.

It is another object of this invention to provide a container insert that may be formed as a single piece of molded plastic and that adequately supports the soil and plant above a water reservoir while permitting adequate water intake by the soil.

It is still another object of this invention to provide a container insert that allows planting soil to be watered from the bottom of the container, thereby minimizing the degree of soil compacting and the amount of water loss due to run off and evaporation.

It is another object of the invention to provide an insert which is to be used with a container that does not include bottom access holes so that the problems of water run-off, soil waste and hole plugging are avoided.

It is yet another object of the invention to provide a container insert that can be used with a range of different-sized containers.

The foregoing and other objects and advantages of the invention will be evident from the following description. In the description, reference is made to the accompanying drawings which form a part hereof, and in which there is shown by way of illustration a preferred embodiment of the invention. Such embodiment does not represent the full scope of the invention. Reference is therefore made to the claims herein for interpreting the scope of the invention.

DETAILED DESCRIPTION OF THE PREFERRED EMBODIMENT

Figure 1:
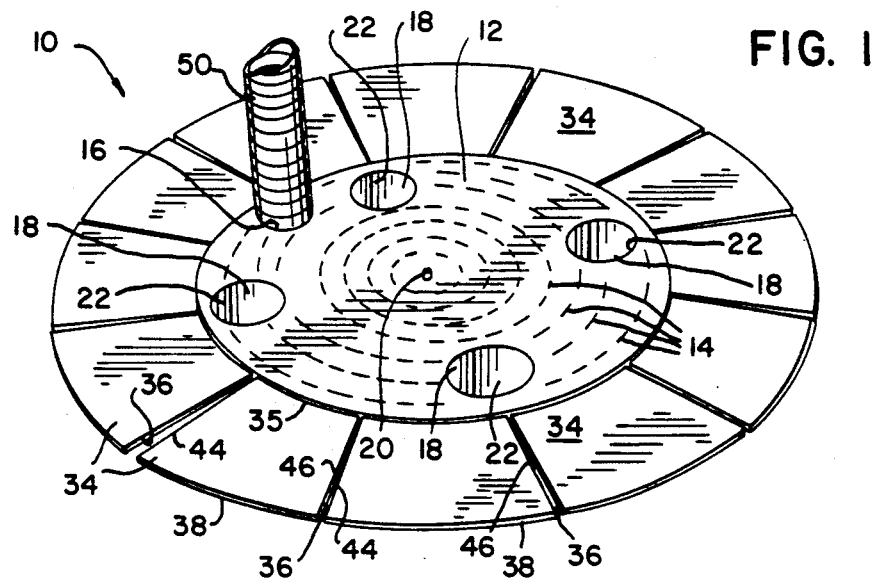
FIG. 1 is a perspective view of a container insert embodying the present invention.
Figure 2:
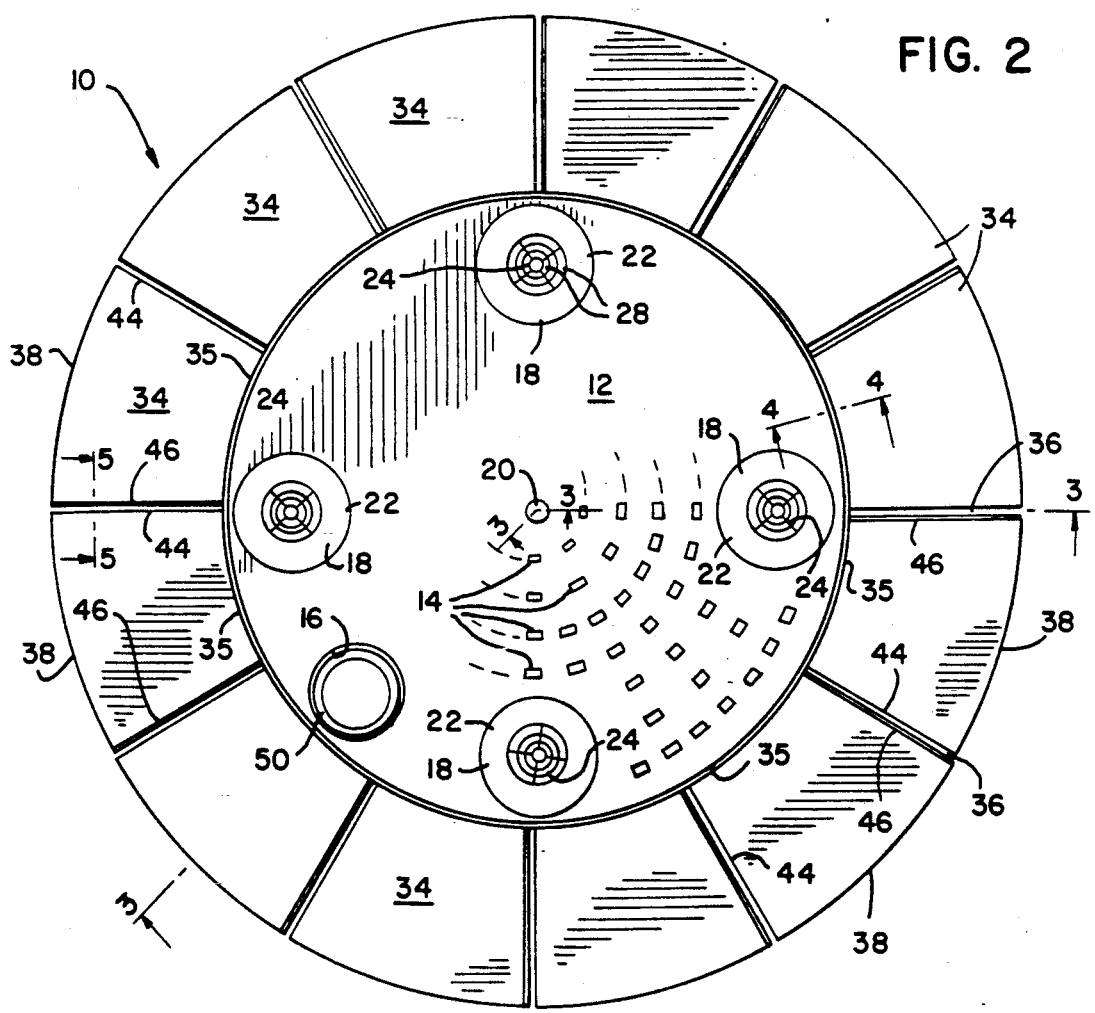
FIG. 2 is an enlarged top view of the container insert shown in FIG. 1.
Figure 3:
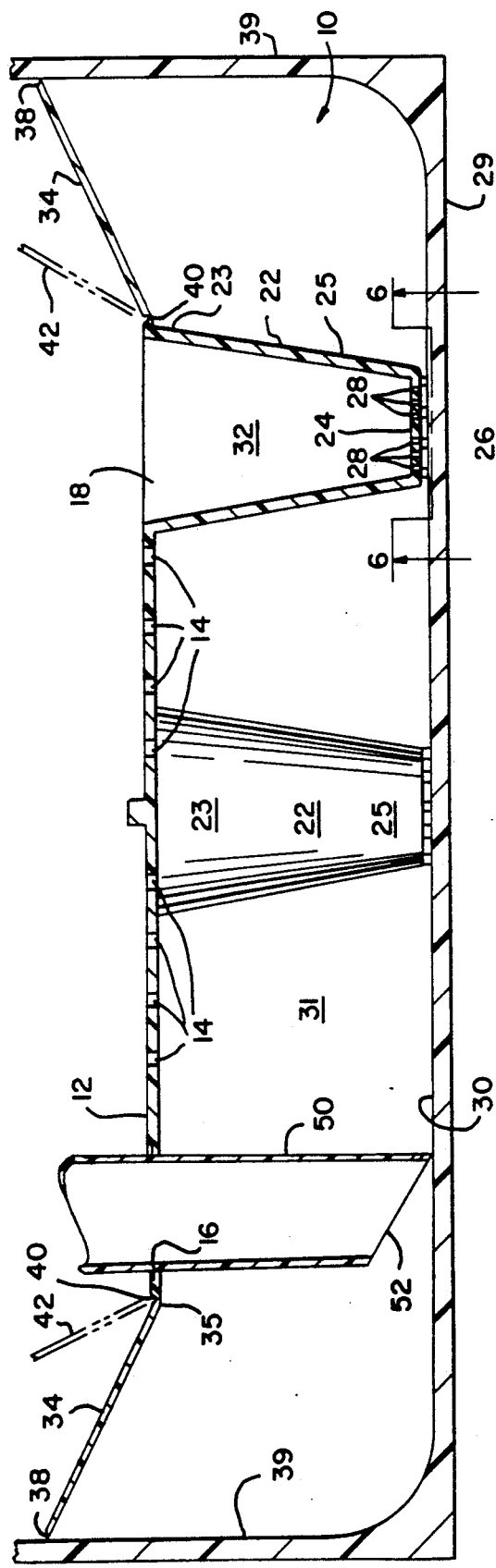
FIG. 3 is a view in vertical section of the container insert taken generally in the plane of the line 3—3 of FIG. 2, however, the insert is positioned in a container and an additional raised position of flap members is shown by dashed lines.

Referring to FIGS. 1-3, a container insert 10 is formed of a sturdy yet flexible material such as plastic as produced by an injection molding process. The container insert 10 includes a base member 12 which is preferably circular and has a plurality of air vents 14 formed therein. The vents 14 are rectangular holes through the base member 12 and are spaced apart about the surface of the base member, such as in the pattern illustrated in FIGS. 1-3 (not all vents shown in FIG. 2). The base member 12 further includes a fill tube opening 16 which is preferably positioned adjacent the periphery of the base member. The base member 12 is formed with four leg openings 18 which are spaced equi-distantly adjacent the periphery of the base member. A molding knob 20 is the result of the plastic molding process used to create the container insert 10.

Figure 6:
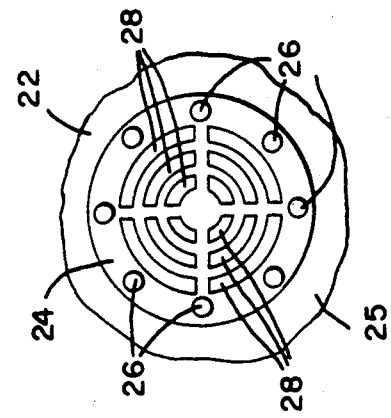
FIG. 6 is a bottom view of a leg member of the container insert taken generally in the plane of the line 6—6 of FIG. 3.

Hollow leg members 22 extend downward from the base member 12. The leg members 22 have a top portion 23 and an opposite bottom portion 25 (FIG. 3). The leg member 22 are conically shaped with the top portion 23 having a larger diameter than the bottom portion 25. Because the leg members 22 are hollow, a conduit 32 (FIG. 3) is formed which extends from the top portion 23 to the bottom portion 25. Adjacent the top portion 23, each leg member 22 is attached to the base member 12 so that the conduit 32 is open to a leg opening 18. Adjacent the bottom portion 25, each leg member 22 is formed with a webbed cover portion 24. As shown in FIGS. 3 and 6, the webbed cover portion 24 has eight downwardly-extending nubs 26. The webbed cover portion 24 also includes a pattern of curved slots 28 which are designed to allow water to pass into the conduit 32 from the area beneath and surrounding the leg member 22.

The container insert 10 is also formed with a plurality of flaps 34 which are flexibly connected to the periphery of the base member 12. The flaps 34 have an attachment edge 35, an opposite outer edge 38, and first and second sides 44 and 46 extending between the attachment and outer edges 35 and 38. As shown best in FIG. 2, the flaps 34 are positioned adjacent one another with only a small space 36 between neighboring flaps 34. Both the attachment edge 35 and the outer edge 38 of the flaps 34 are curved, and the sides 44 and 46 of a single flap 34 are not parallel.

Figure 4:
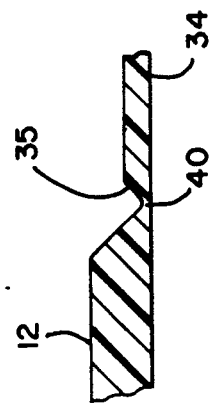
FIG. 4 is an enlarged view in vertical section taken in the plane of the line 4—4 of FIG. 2.

Viewing FIG. 4, it can be seen that the plastic material forming the insert 10 has a narrowed portion 40 connecting the base member 12 and the attachment edge 35 of each flap 34. This narrowed portion 40, in combination with the flexibility of the plastic material, allows the flaps 34 to be manipulated so that the flaps may lie in a plane transverse (i.e., non-coplanar) to the plane containing the base member 12. In particular, the flaps 34 may assume a position as illustrated by the flaps 34 in FIG. 3. The flaps may raise further to a position as illustrated by the dashed lines 42 in FIG. 3.

Figure 5:
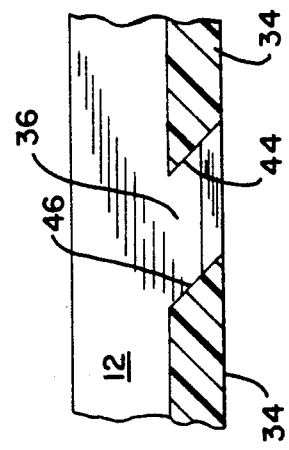
FIG. 5 is an enlarged view in vertical section taken in the plane of the line 5—5 in FIG. 2.

As shown most clearly by the neighboring flaps 34 in FIG. 5, the sides 44 and 46 are oppositely tapered. When the flaps 34 are raised above the plane of the base member 12 as illustrated by flaps 34 (also flaps 42) in FIG. 3, the sides 44 and 46 of neighboring flaps tend to overlap. As the flaps 34 are moved out of the plane of the base member 12, the first and second sides of neighboring flaps will contact one another. Because the sides 44 and 46 are tapered, the first side 44 tends to ride over the oppositely tapered second side 46. This prevents adjacent sides of neighboring flaps from moving together and causing the flaps to buckle, such as would occur if the sides were not tapered.

A hollow fill tube 50 is appropriately sized to fit in the fill tube opening 16 of the base member 12. The fill tube 50 is formed of a flexible plastic coil open to both ends. A lower, angled end 52 (FIG. 3) of the fill tube 50 extends downward beneath the base member 12, as shown in FIG. 3. The appropriate height of the fill tube 50 is dependent upon the amount of soil that is to be placed in the container. The fill tube 50 should extend upward above the intended level of the soil.

To use the container insert 10, the insert is positioned in a planting container 29 (partially shown in FIG. 3) with the leg members 22 resting on the floor 30 of the container. The base member 12 will then be supported above the floor 30 creating a cavity 31 within the walls 39 of the container 29 between the insert 10 and the floor 30. As the insert 10 is placed in the container 29, the outer edges 38 of the flaps 34 should contact the walls 39 of the container, and cause the flaps to rise above the plane of the base member 12.

The same size insert 10 may be used with a range of container sizes. An insert 10 can be used with a container if the outer edges 38 of the flaps 34 properly rest against the interior walls of the container. Due to contact with the interior walls of the container, the flaps 34 should be forced above the plane of the base member 12 as the insert 10 is positioned in the container. As the flaps 34 angle toward the position illustrated by flaps 34 (and 42) in FIG. 3, the sides 44 and 46 of neighboring flaps 34 will contact one another and tend to overlap. The flaps 34 will also tend to center the insert 10 within the walls of the container. With the legs 22 resting on the floor 30 of the container, an appropriate size container for a given size insert 10 should have an inside diameter (at the level of the base member 12) that is greater than the diameter of the base member 12. Also, the inside diameter should be less than the diameter of the overall insert 10 measured with the flaps 34 positioned in the plane containing the base member 12. When an insert is positioned in a container meeting these requirements, the plane of each flap 34 will be transverse to the plane containing the base member 12, and the flaps will be positioned above the plane of the base member. That is, the flaps 34 will tend to move toward the position illustrated by flaps 34 in FIG. 3. Preferably, the flaps 34 will be raised sufficiently so that the sides 44 and 46 of neighboring flaps contact or overlap. This prevents soil from passing through the spaces 36 between neighboring flaps 34.

After the insert 10 is positioned in an appropriately-sized container, such as container 29 in FIG. 3, the fill tube 50 is inserted into the fill tube opening 16, with the lower end 52 resting on the floor 30 of the container. The angled, lower end 52 prevents the fill tube 50 from creating a seal with the floor 30 of the container, and allows water to pass from within the fill tube 50 to the cavity 31. Because the fill tube extends from the floor 30 of the container to above the soil in a substantially vertical manner, the tube can be used to measure the water level within the container. A pipette or stick with a float (not shown) may be inserted into the fill tube 50 to check the water level.

With the insert 10 and fill tube 50 in place, plant and soil material (not shown) placed in the container 20 will be supported above the insert 10. Soil is held above the insert 10 by the flaps 34 because the outer edges 38 of the flaps 34 are pressed against interior walls 39 of the container. When the flaps 34 move toward the position of flaps 34 in FIG. 3, the sides 44 and 46 contact and overlap and the space 36 between neighboring flaps 34 is reduced to a smaller area adjacent the base member 12. This smaller area minimizes the amount of soil that tends to pass between the flaps 34 to the cavity 31.

Soil is also supported on the base member 12. The air vents 14 allow air within the cavity 31 to pass into the soil (and vice versa), but prevent substantial amounts of soil from falling into the cavity. The air vents 14 are preferably rectangular in shape to minimize the soil loss through the vents. Because the plant and soil do not have to be top watered, the amount of water passing through the air vents 14 is essentially eliminated. The amount of soil washed through the air vents 14 with the water is thus also eliminated. The size of the air vents 14 may vary depending on the type of soil (e.g., smaller for fine soils). It should also be noted that the fill tube 50 fits snugly within the fill tube opening 16 so that no soil passes between the tube and the opening.

Soil placed on the insert 10 will enter the conduits 32 of the leg members 22. The soil in the conduits 32 is prevented from passing into the cavity 31 by the webbed cover portions 24. Like the air vents 14, the slots 28 in the cover portions 24 are sized to prevent substantial amounts of soil from passing through the slots into the cavity 31, and the size of the slots 28 may be varied depending on the type of soil. Curved or straight slots, or rectangles, are preferred over circles or other shapes because they allow water to pass through the webbed cover portion 24 and do not allow substantial amounts of soil to enter the cavity 31.

The insert 10 advantageously permits the plant to be watered without top watering. The fill tube 50 is designed to protrude above the soil and extend through the base member 12 to the floor 30 of the container 29. Water added to the top of the fill tube 50 falls through the tube 50 to the floor 30 of the container 29. The angled end 52 of the fill to be 50 assures that the water can pass into the cavity 31. Watering in this manner substantially eliminates the disadvantages associated with top watering, such as compacting and run-off. Additionally, any water in the cavity 31 which evaporates will generally be carried by the air into the soil through the air vents 14.

Water in the cavity 31 forms a water reservoir providing a constant supply of water which may be drawn up though the soil to the plant. The water will pass through the slots 28 in the webbed cover portions 24 and enter the conduits 32 of the leg members 22. The nubs 26 elevate the cover portions 24 from the floor 30, which aids in allowing water to pass from the cavity 31 to the conduits 32. Besides using slots 28 and nubs 26, other ways could also be employed to channel water from the cavity 31 into the conduit 32 such as vertically-extending slots (not shown) on the bottom portion 25 of each leg member 22. The soil mixture determines the amount of water that is drawn upward to the soil positioned above the base member 12. As a result, the soil will be more evenly moist compared to top watering. Also, the saturated area of soil may be limited to that portion of the soil within the conduits 32 of the leg members 22.

The soil near the bottom of the container 29 is exposed to air because an air gap is formed immediately beneath the base member 12. The air vents 14 formed in the base member 12 allow to pass between the soil and the air gap. The air gap exists even after watering, because the water is preferably only added to one-half inch beneath the base member 12. The water level may be determined through the fill tube 50, as noted previously. Thus, the soil situated on the base member 12 is not saturated even after watering.

The method of watering also allows the plant to be watered less frequently. By supporting soil above the floor 30 of the container 29 by a distance equal to the height of the legs 22, more water can be supplied to the container compared to top watering a container not having the insert 10. This results because a smaller area of the soil becomes saturated. Only the soil in the conduits 32 of the leg members 22 is below the water level. Also, the portion of the soil that becomes saturated is minimized because the leg members 22 are conically shaped. A reservoir of water is established and the soil can draw water from the water reservoir as needed.

The preferred insert 10 has four leg members 22, although the number, size and shape of leg members may vary for different applications. The leg members 22 must adequately support the weight that is to be positioned above the insert 10. Three legs are normally needed for balance, although a single, large-diameter leg (not shown) positioned in the center of the base member 12 may be adequate, especially if the base member and flaps 34 fit tightly within the container 29. Leg members could also be elongated or rectangular if desired. The preferred design, however, is to use four, conically-shaped leg members 22 as generally positioned and sized as illustrated in the drawings.

The number and size of the leg members 22 affects the amount of water that is available to the soil. A greater number of legs or larger legs will increase the amount of soil below the water level in the cavity 31, and will therefore increase the amount of saturated soil. The soil will be able to draw more water as the amount of soil in contact with the water increases. The proper number and size of the leg members may thus depend on the type of soil to be used.

The foregoing detailed description has been for the purpose of illustration. Thus, a number of modifications and changes may be made without departing from the spirit and scope of the present invention. For example, the insert 10 is shown in a generally circular design. The insert could be easily modified to accommodate square or oval containers by changing the general shape of the base member 12 and the flaps 34. Likewise, water could be added directly to the bottom 30 of the container through an opening in the wall 39 of the container. This would eliminate the need for the fill tube 50 and the fill tube opening 16. Therefore, the invention should not be limited by the specific embodiment described, but only by the claims.

I claim:

1. An insert for a container, comprising:
   a base member sized to fit within the container, said base member having a leg opening;
   a leg member having a top portion, an opposite bottom portion, and a conduit extending between said top and bottom portions, said leg member being attached to said base member so that said conduit is open to said leg opening; and
   a plurality of flaps flexibly connected to said base member, said flaps being positioned adjacent one another about the periphery of said base member.

2. The insert according to claim 1, wherein said base member is formed with a plurality of air vents.

3. The insert according to claim 1, wherein said base member has a fill tube opening, and the insert further comprises a hollow fill tube that is positionable in said fill tube opening.

4. The insert according to claim 1, wherein said leg member is generally conically shaped, said top portion having a larger diameter than said bottom portion.

5. The insert according to claim 1, wherein said base member, said leg member and said flaps are integrally formed.

6. The insert according to claim 1, wherein said base member has four leg openings and there are four leg members that correspond with the four leg openings.

7. The insert according to claim 1, wherein:
   each flap has an attachment edge, an opposite outer edge, and two sides extending between said attachment and outer edges;
   said attachment edge is flexibly connected to the periphery of said base member; and
   the flexible connection allows each flap to be positioned in a plane transverse to the plane containing said base member.

8. The insert according to claim 7, wherein said sides of the neighboring flaps are oppositely tapered along a thickness of the flap.

9. The insert according to claim 1, wherein said leg member includes a slot to permit a fluid to enter said conduit from outside said leg member.

10. The insert according to claim 9, wherein said slot is formed in a webbed cover portion attached to said bottom portion of said leg member.

11. The insert according to claim 10, wherein said webbed cover portion includes a plurality of nubs.

12. An insert for a container having a floor and walls extending upward therefrom, the insert comprising:
    a base member sized to fit within the walls of the container, said base member having a leg opening and a fill tube opening;
    a leg member having a top portion, an opposite bottom portion, and a conduit extending between said top and bottom portions, said leg member being attached to said base member so that said conduit is open to said leg opening, said leg member having a slot in communication with said conduit;
    a plurality of flaps, each flap having an attachment edge flexibly connected to said base member, an opposite outer edge, and two sides extending between said attachment and outer edges, said flaps being positioned next to one another about the periphery of said base member, said outer edges engaging the walls of the container when said leg member rests on the floor of the container; and
    a hollow fill tube positionable within said fill tube opening.

13. The insert according to claim 12, wherein said sides of the neighboring flaps are oppositely tapered along a thickness of the flap.

14. The insert according to claim 12, wherein said base member is formed with a plurality of air vents.

15. The insert according to claim 12, wherein said leg member has a webbed cover portion and said slot is formed in said webbed cover portion to permit fluid to enter said conduit from outside said leg member.

16. The insert according to claim 15, wherein said webbed cover portion includes a plurality of nubs.

17. The insert according to claim 12, wherein said leg member is generally conically shaped, said top portion having a larger diameter than said bottom portion.

18. The insert according to claim 12, wherein said base member, said leg member and said flaps are integrally formed.

19. The insert according to claim 12, wherein said base member has four leg openings and there are four leg members that correspond with the four leg openings.

20. The insert according to claim 1, wherein each flap has an attachment edge connected to the periphery of said base member, and an opposite outer edge which is longer than said attachment edge.

21. The insert according to claim 12, wherein the opposite outer edge of each flap is longer than the corresponding attachment edge.

* * * * *

UNITED STATES PATENT AND TRADEMARK OFFICE
CERTIFICATE OF CORRECTION

PATENT NO. : 5,155,934
DATED : October 20, 1992
INVENTOR(S) : Gerard F. Leider It is certified that error appears in the above-identified patent and that said Letters Patent is hereby corrected as shown below:

On the cover page, change the inventor's name from
   "Gerald F. Leider" to --Gerard F. Leider--.

In Column 2, at line 34, change "veins" to --vents--.

In Column 6, at line 22, change "to be" to --tube--.

Signed and Sealed this

Twenty-sixth Day of October, 1993

Attest:

BRUCE LEHMAN

Attesting Officer

Commissioner of Patents and Trademarks